United States Patent
Ishikawa

[19]

[11] Patent Number: 5,978,598
[45] Date of Patent: Nov. 2, 1999

[54] IMAGE BLUR CORRECTION APPARATUS

[75] Inventor: Masanori Ishikawa, Tokyo, Japan

[73] Assignee: Canon Kabushiki Kaisha, Tokyo, Japan

[21] Appl. No.: 09/119,729

[22] Filed: Jul. 21, 1998

[30] Foreign Application Priority Data

Jul. 24, 1997 [JP] Japan ................................ 9-212683

[51] Int. Cl.$^6$ .................................................. G03B 17/00
[52] U.S. Cl. ............................................ 396/50; 396/55
[58] Field of Search ...................................... 396/50, 55

[56] References Cited

U.S. PATENT DOCUMENTS

| | | | |
|---|---|---|---|
| 5,335,032 | 8/1994 | Onuki et al. | 396/50 |
| 5,729,770 | 3/1998 | Kai et al. | 396/55 X |
| 5,732,289 | 3/1998 | Tsukahara et al. | 396/50 |
| 5,794,078 | 11/1998 | Okazaki | 396/50 |

Primary Examiner—W. B. Perkey
Attorney, Agent, or Firm—Fitzpatrick, Cella, Harper & Scinto

[57] ABSTRACT

In this invention, an image blur correction apparatus adapted to an optical apparatus, which has an image blur correction means, a driving means for driving the image blur correction means in a predetermined direction, and an energization control means for controlling energization to the driving means in accordance with a vibration signal corresponding to the vibration state of the optical apparatus, also has an energization restricting means for restricting a current supplied to the driving means by the energization control means to less than a predetermined restricting level, and a determination means for determining the restricting level of the energization restricting means in accordance with the detection result of a gravitation direction detection means for detecting the gravitation direction, whereby the upper limit of the energization amount to the driving means is changed in accordance with the gravitation direction to attain driving suitable for the direction of gravitation acting on the apparatus.

11 Claims, 15 Drawing Sheets

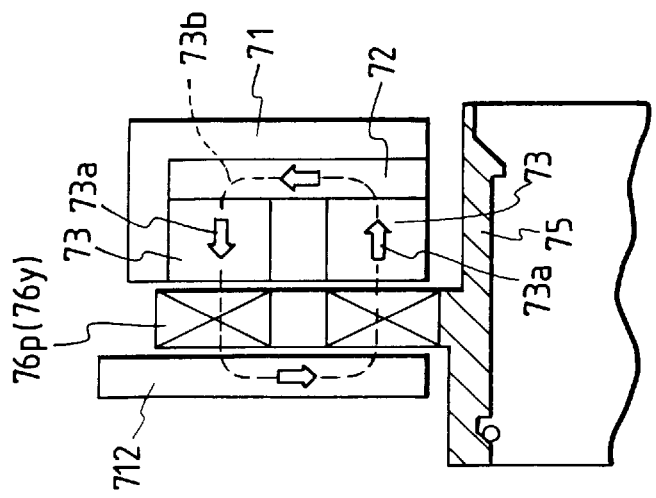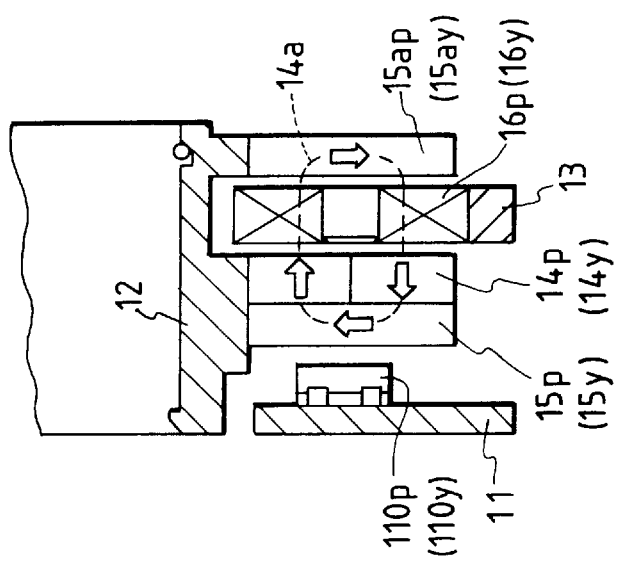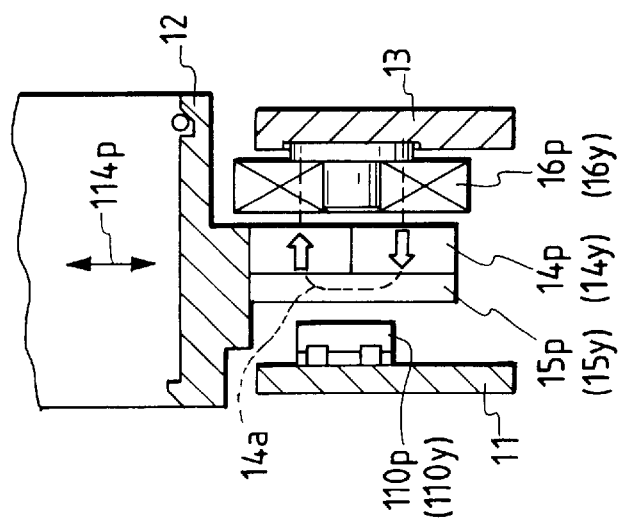

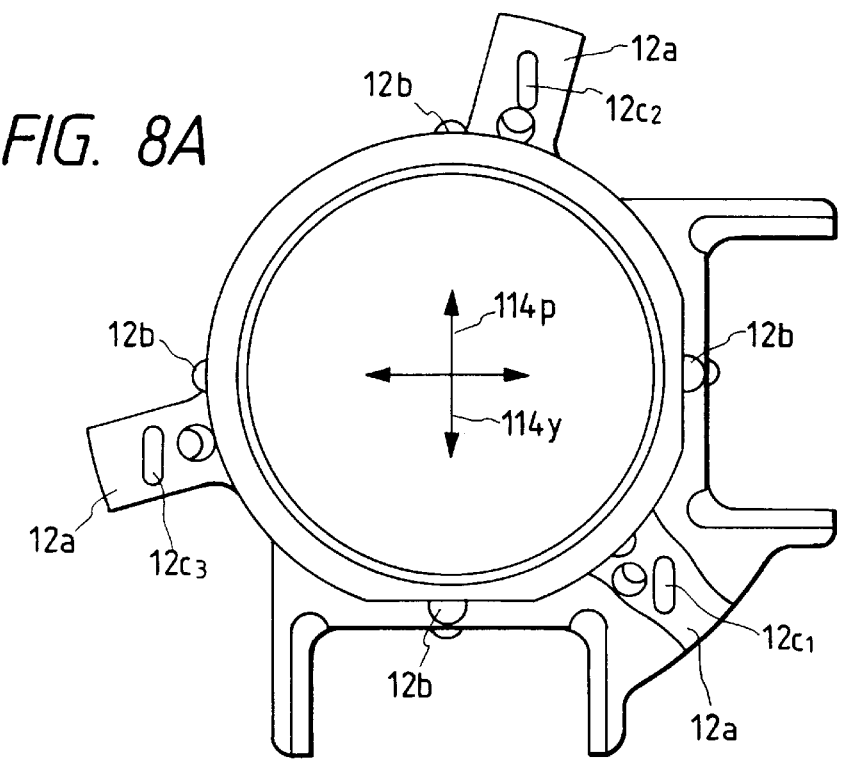
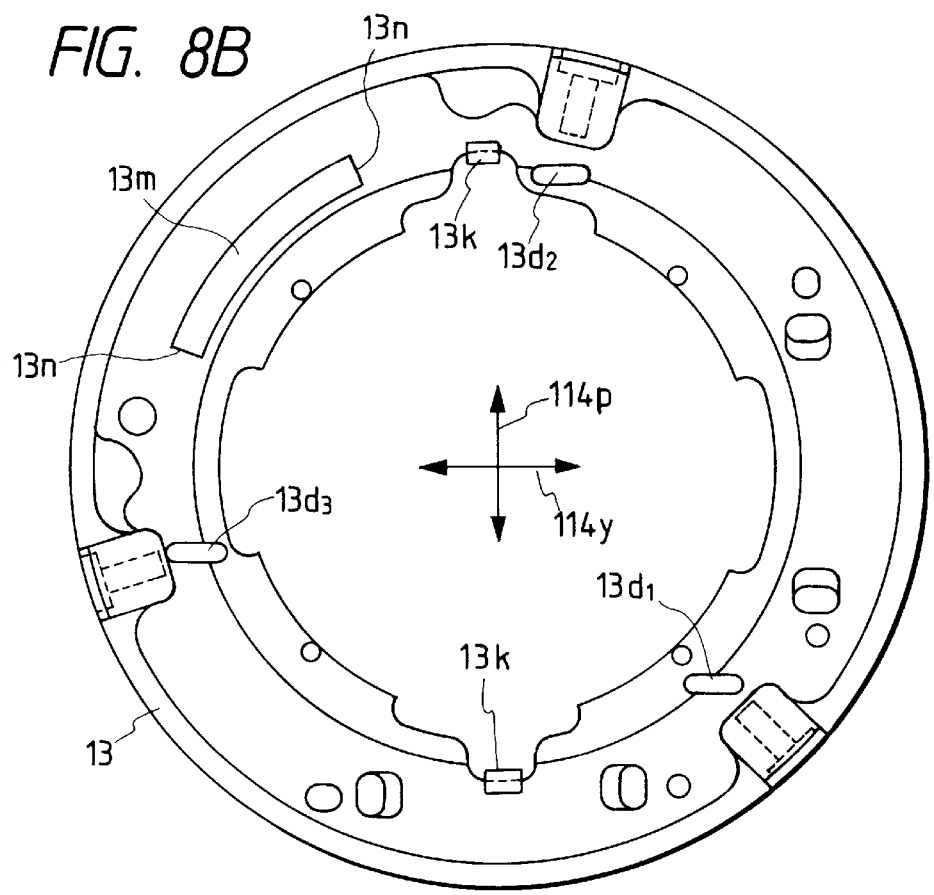

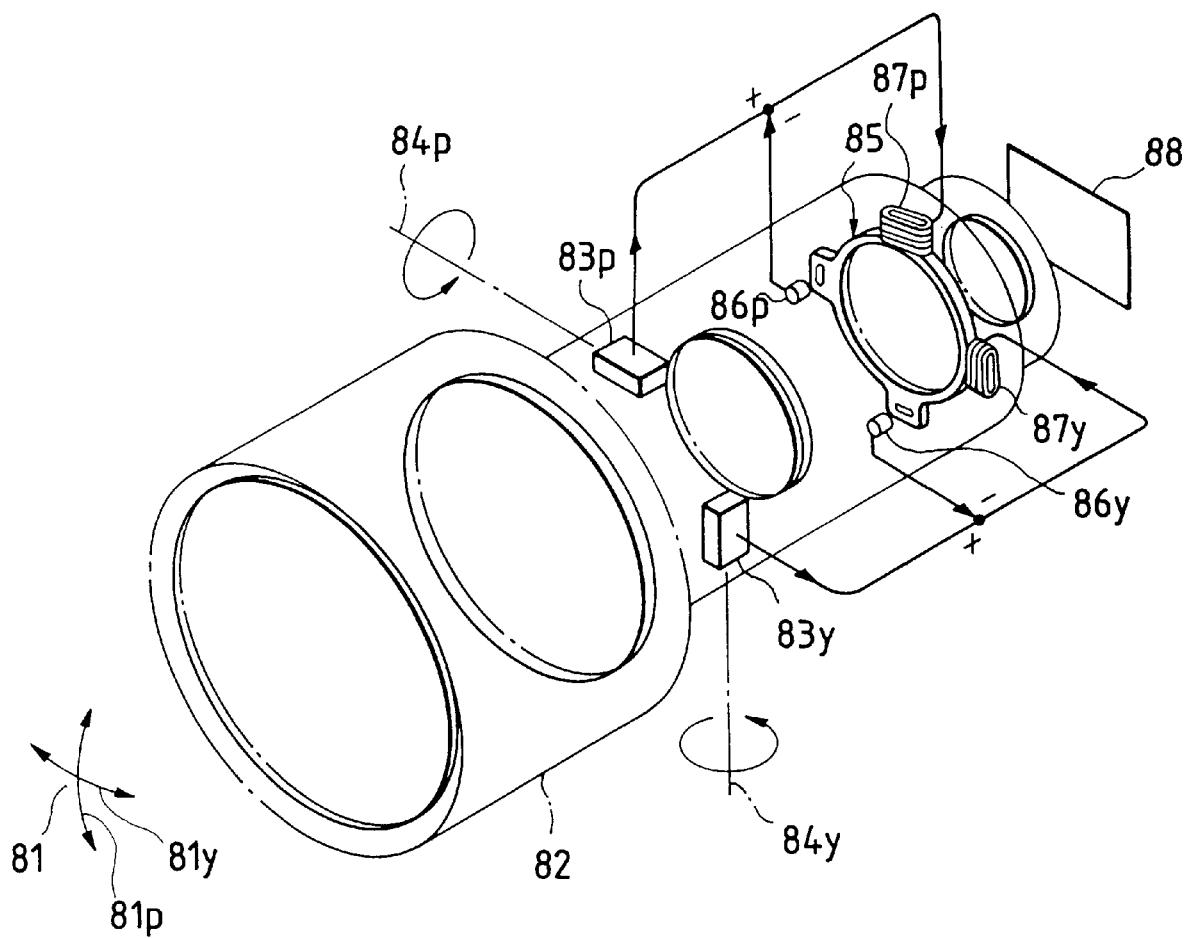

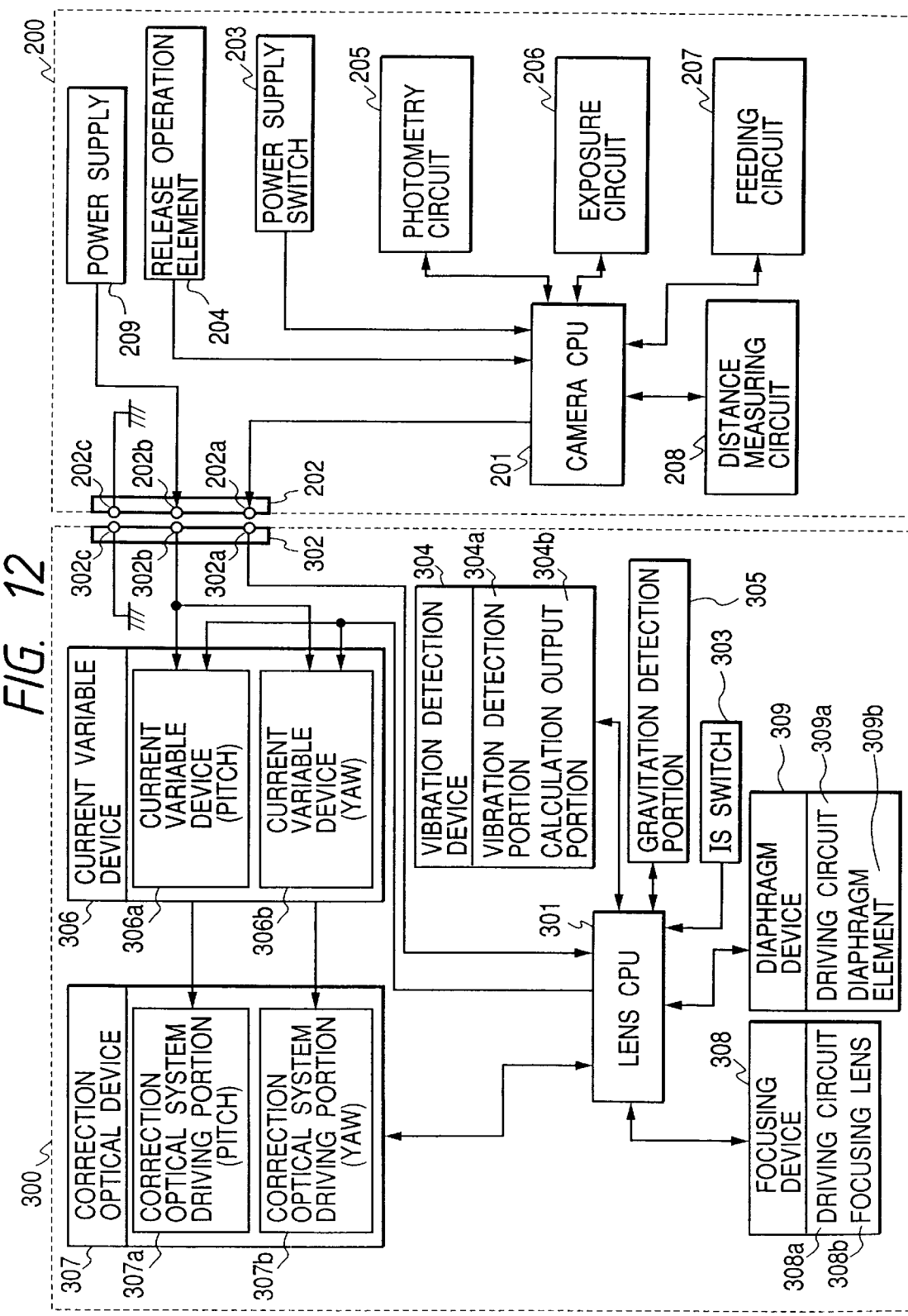

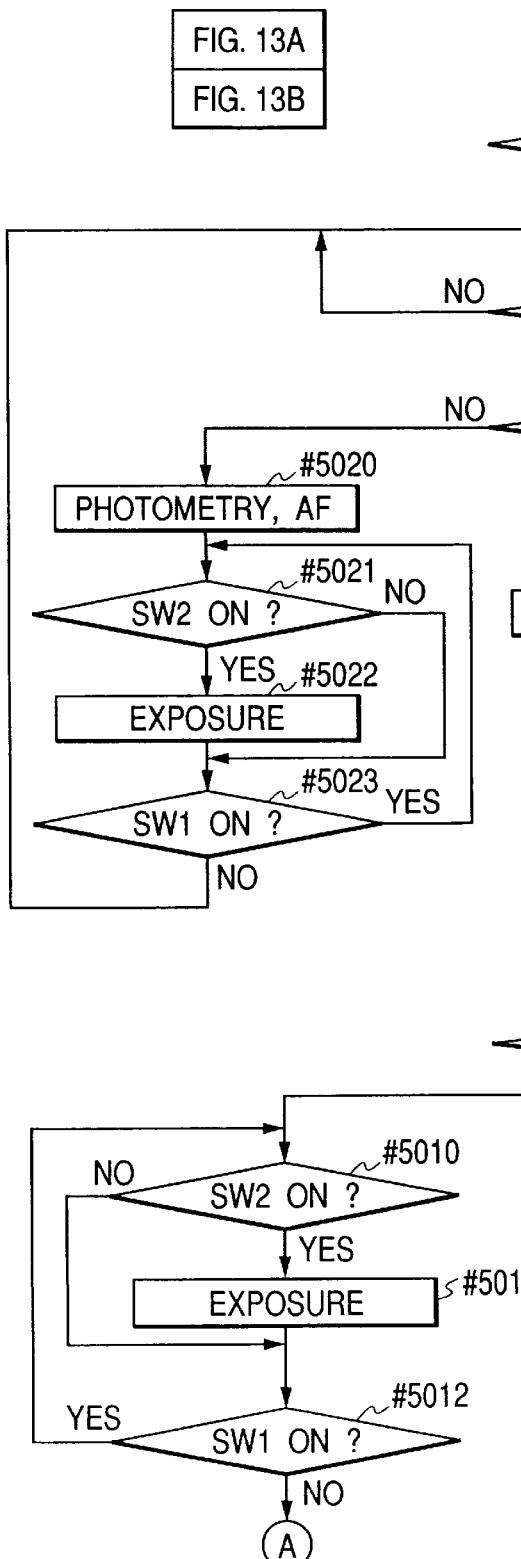
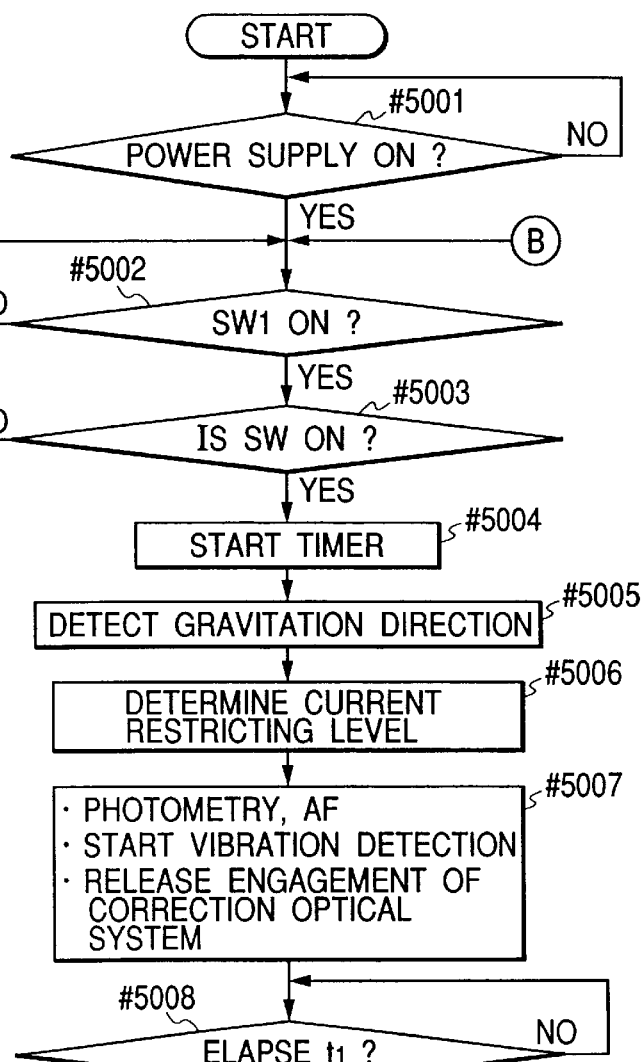
FIG. 13
FIG. 13A

IMAGE BLUR CORRECTION APPARATUS

BACKGROUND OF THE INVENTION

1. Field of the Invention

The present invention relates to an image blur correction apparatus for correcting an image blur produced by hand vibrations and the like in a camera, optical equipment, and the like.

2. Related Background Art

Since all operations such as exposure determination, focusing, and the like important for photographing are automated in contemporary cameras, even a person who is not skilled in camera operation rarely fails in taking pictures.

In recent years, a system for correcting an image blur produced by hand vibrations acting on a camera has been studied, and nearly all factors that lead to photographing failures are removed.

A system for correcting an image blur produced by hand vibrations will be briefly explained below.

Hand vibrations of a camera upon photographing normally have a frequency ranging from 1 Hz to 12 Hz. In order to take a picture free from any image blur even when such hand vibrations have been produced upon releasing the shutter, simply stated, vibrations of the camera produced by hand vibrations must be detected, and a correction lens must be displaced according to the detection value. Hence, in order to take a picture free from any image blur even when hand vibrations have been produced, camera vibrations must be accurately detected as a first requirement, and changes in optical axis arising from the camera vibrations must be corrected by displacing the correction lens as a second requirement.

In principle, such vibrations (camera vibrations) can be detected by mounting, in a camera, a vibration detection device or the like, which is comprised of a vibration detection portion for detecting acceleration, velocity, or the like, an integrator for electrically or mechanically integrating the output signal from the vibration detection portion to output a displacement, and the like. An internal correction optical device is controlled to change the photographing optical axis based on the detection information or the like, i.e., a correction optical system is displaced via a driving means to attain image blur correction.

In order to drive the correction optical system, a coil and magnet are conventionally used as a driving means. The coil or magnet is set on a stationary portion, the magnet or coil is set in the correction optical system, and the optical system is driven by supplying a current to the coil. In an image blur correction device proposed, when the vibration detection device detects vibrations in a vertical vibration direction (to be referred to as a pitch direction hereinafter) upon holding the camera at normal position, and in a horizontal direction (to be referred to as a yaw direction hereinafter) perpendicular to the pitch direction, the driving means (two sets of driving means are set to correct vibrations in the two directions, i.e., the pitch and yaw directions) are independently driven in the two directions.

With the above-mentioned image blur correction device, the photographer can enjoy less strict photographing conditions regardless of hand vibrations, but since the driving means for driving the correction optical system are added, the following problems are feared.

First, when the photographer inadvertently moves the camera before actual photographing, a large vibration amount is detected, and an unnecessarily large current is supplied to the driving means for the correction optical system. As a consequence, the camera battery is wasted, thus disturbing energy and power savings.

Second, when a large current is supplied to drive the correction optical system while film feeding or electronic flash charging is in progress, large current loads are superposed, thus posing a serious problem in the camera system.

To solve such problems, a current restricting means for restricting the current to be supplied to the driving means for the correction optical system is used to attain power savings in the driving means.

However, when the correction optical system is driven in the two directions, i.e., pitch and yaw directions, the loads acting on the driving means in the individual directions are not always equal to each other as they largely depend on gravitation acting on the correction optical system. More specifically, since an extra load acts in driving the correction optical system in the gravitation direction, a larger load acts on the driving means in the gravitation direction. However, conventionally, since the current restricting levels that allow currents to be supplied to the driving means for the correction optical system assume equal values in both the pitch and yaw direction regardless of any imbalance corresponding to the weight of the correction optical system, the driving force of the driving means in the gravitation direction considerably deteriorates as compared to the driving means in the other direction.

SUMMARY OF THE INVENTION

One aspect of the invention is to provide an image blur correction apparatus which is adapted to an optical apparatus, comprising image blur correction means, driving means for driving the image blur correction means in a predetermined direction, energization control means for controlling energization to the driving means in accordance with a vibration signal corresponding to a vibration state of the optical apparatus, energization restricting means for restricting a current supplied to the driving means by the energization control means to less than a predetermined restricting level, and determination means for determining the restricting level of the energization restricting means in accordance with a detection result of gravitation direction detection means for detecting a gravitation direction, whereby driving corresponding to gravitation acting on the apparatus is made.

BRIEF DESCRIPTION OF THE DRAWINGS

FIGS. 6A, 6B and 6C are views for explaining the arrangement of driving means for blur correction according to an embodiment of the present invention upon comparison with the conventional arrangement, in which FIG. 6A shows the embodiment of the present invention, FIG. 6B shows an unpreferable example, and FIG. 6C shows the prior art;

FIG. 7 is a plan view showing a hardware board shown in FIG. 1 and the like;

FIGS. 8A and 8B are views showing a support frame and base plate shown in FIG. 1 and the like from the rear surface side in FIGS. 3A and 3B;

FIGS. 10A and 10B are views for explaining a lock mechanism of the support frame by the lock ring shown in FIG. 1 and the like;

FIG. 11 is a perspective view showing the schematic arrangement of a system for correcting an image blur according to an embodiment of the present invention;

FIG. 12 is a block diagram showing the circuit arrangement of an exchangeable lens and camera body, which mount an image blur correction apparatus according to an embodiment of the present invention;

DETAILED DESCRIPTION OF THE PREFERRED EMBODIMENT

Figure 1:
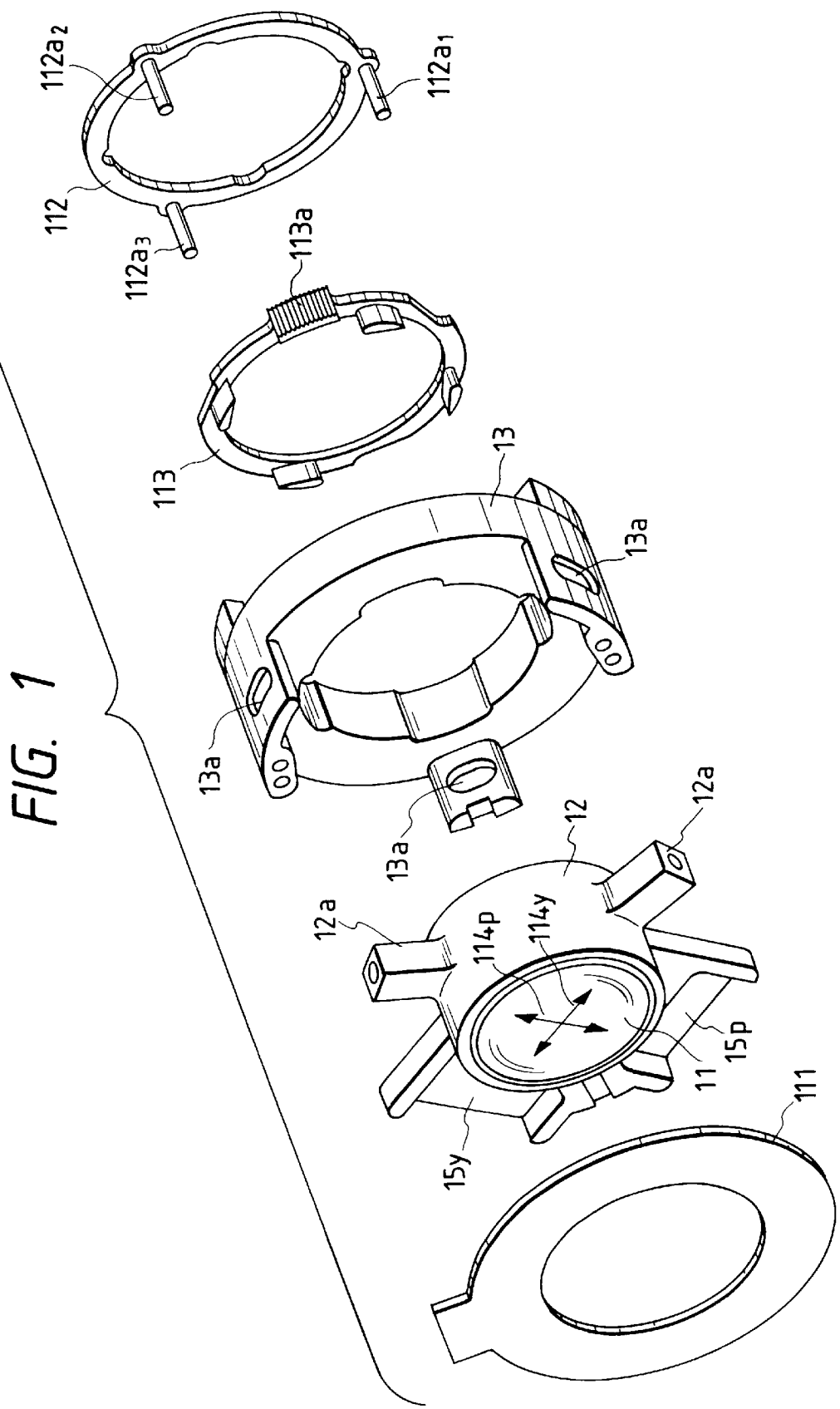
FIG. 1 is an exploded perspective view of principal building members of a correction optical device according to an embodiment of the present invention.

The present invention will now be described in detail on the basis of the illustrated embodiment.

FIG. 11 schematically shows the arrangement of a system (an image blur correction apparatus comprising a correction optical system, vibration detection device, and the like) for correcting an image blur produced by hand vibrations according to an embodiment of the present invention, i.e., a system for correcting an image blur arising from vertical and horizontal camera vibrations 81p and 81y in the directions of arrows 81 in FIG. 11.

In FIG. 11, the system includes a lens barrel 82, and vibration detection portions 83p and 83y for respectively detecting vertical and horizontal camera vibrations. These vibration detection portions 83p and 83y respectively have vibration detection directions 84p and 84y. A correction optical device 85 (including coils 87p and 87y for giving thrusts to a correction lens, and position detection elements 86p and 86y for detecting the positions of the correction lens) is driven based on the outputs from vibration sensors 83p and 83y as target values, and assures stability on an image plane 88.

Figure 2:
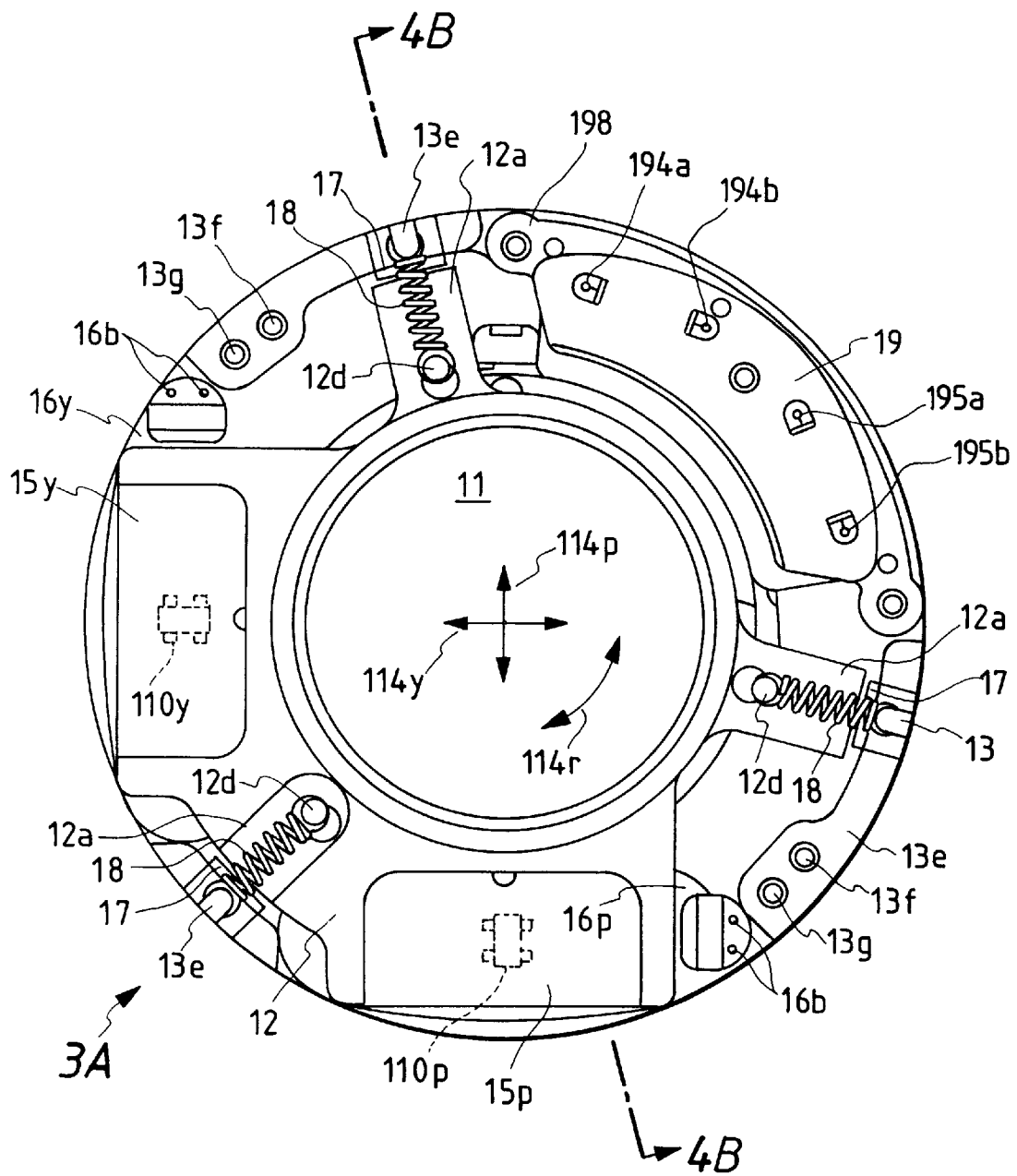
FIG. 2 is a side view of the correction optical device viewed from the left side in FIG. 1.
Figure 7:
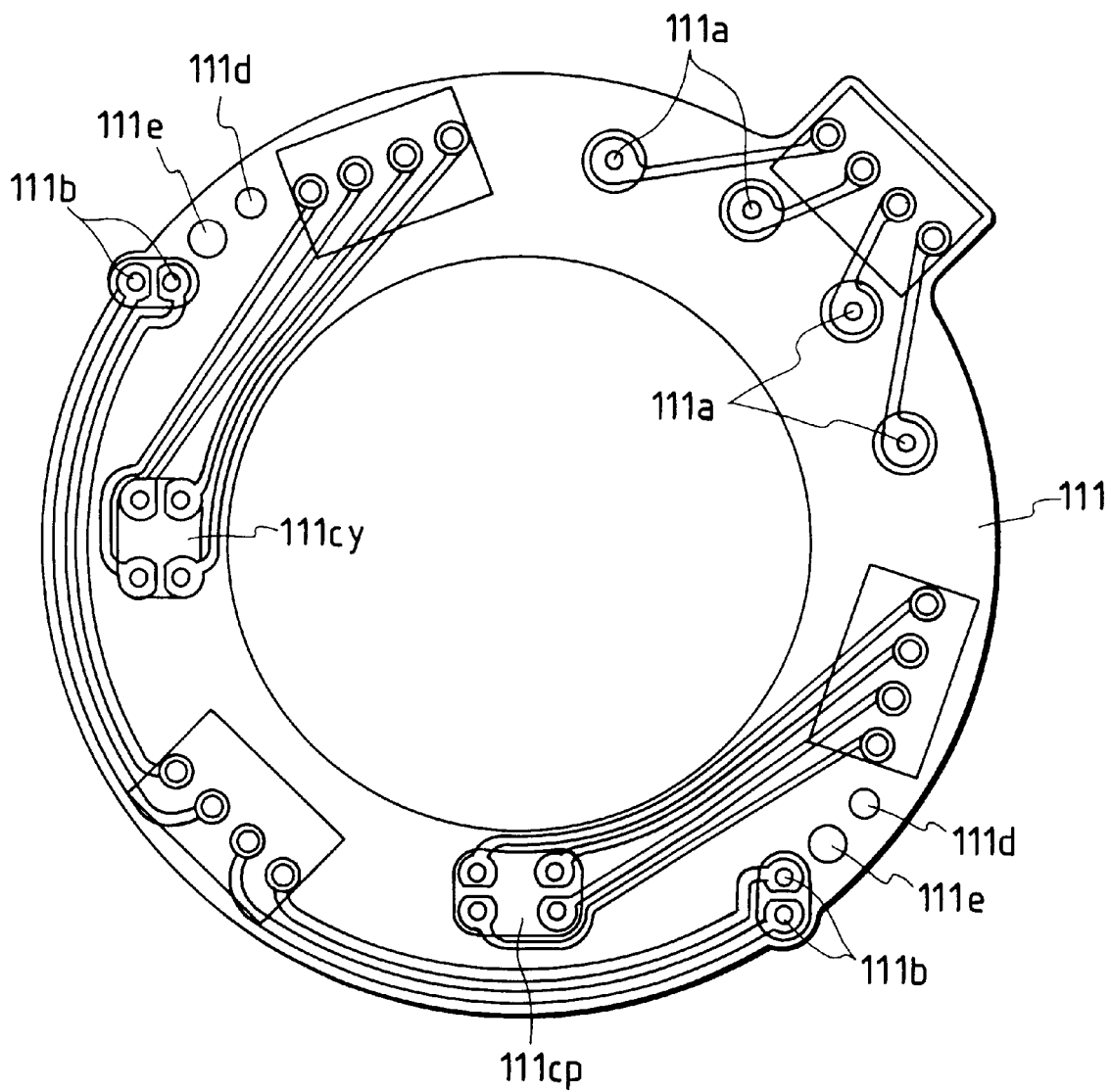
Figure 9A:
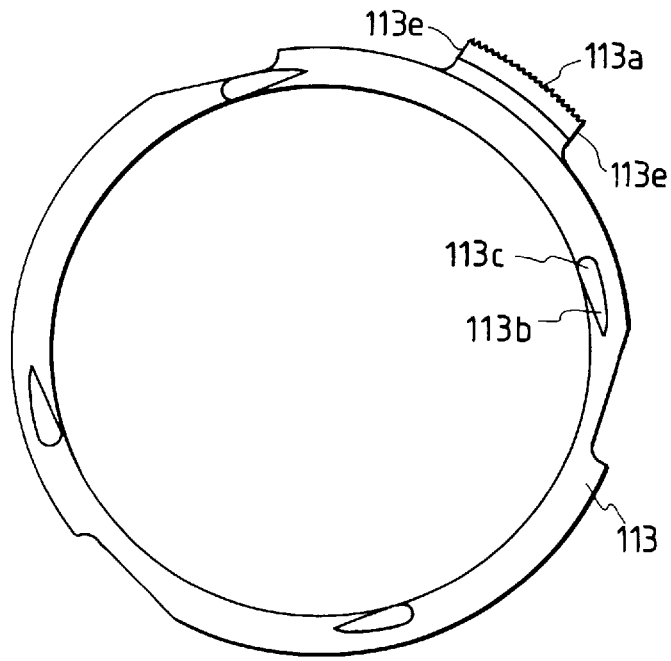
FIGS. 9A, 9B, 9C and 9D are views showing a lock ring and rolling regulating ring shown in FIG. 1 and the like from the plane shown in FIG. 2.
Figure 9B:
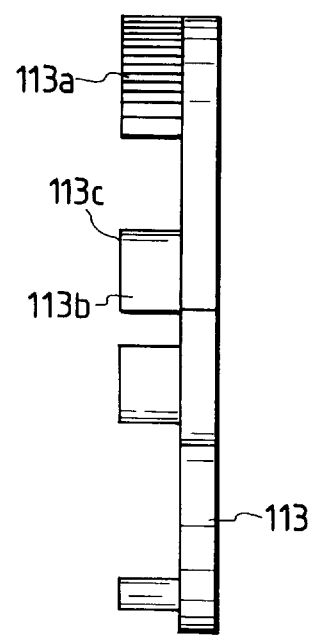
Figure 9C:
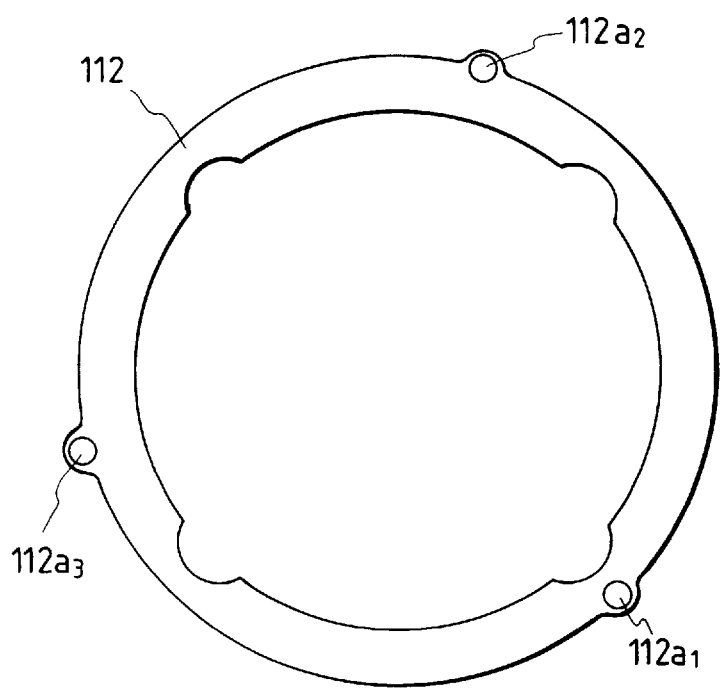
Figure 9D:
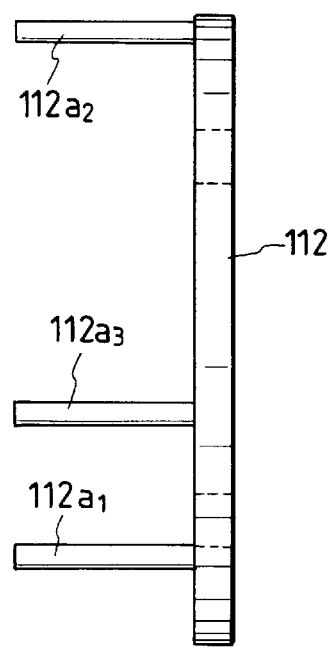
Figure 10A:
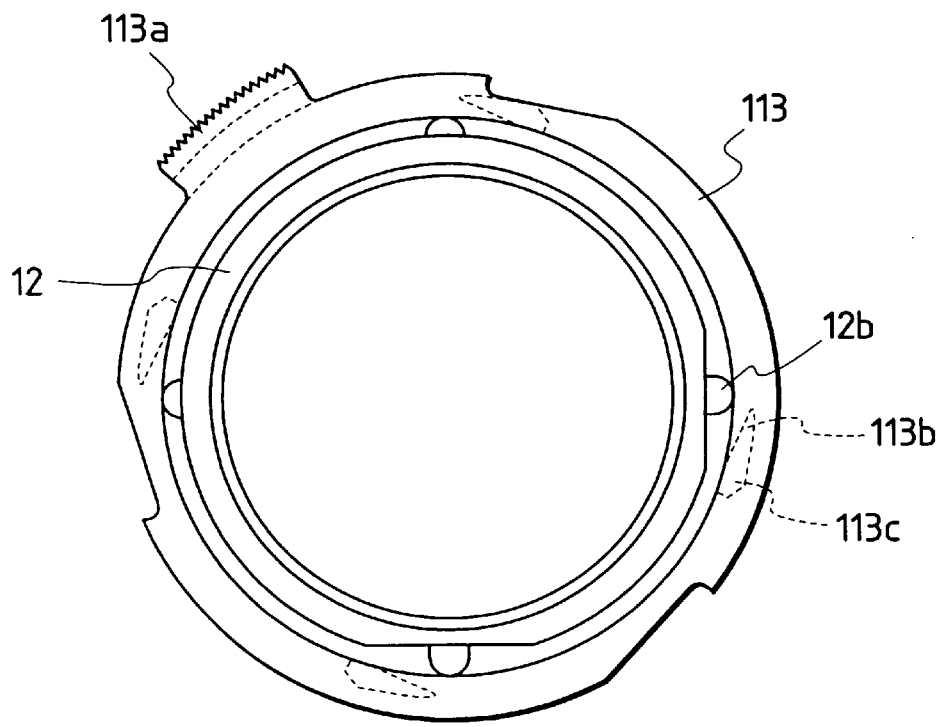
Figure 10B:
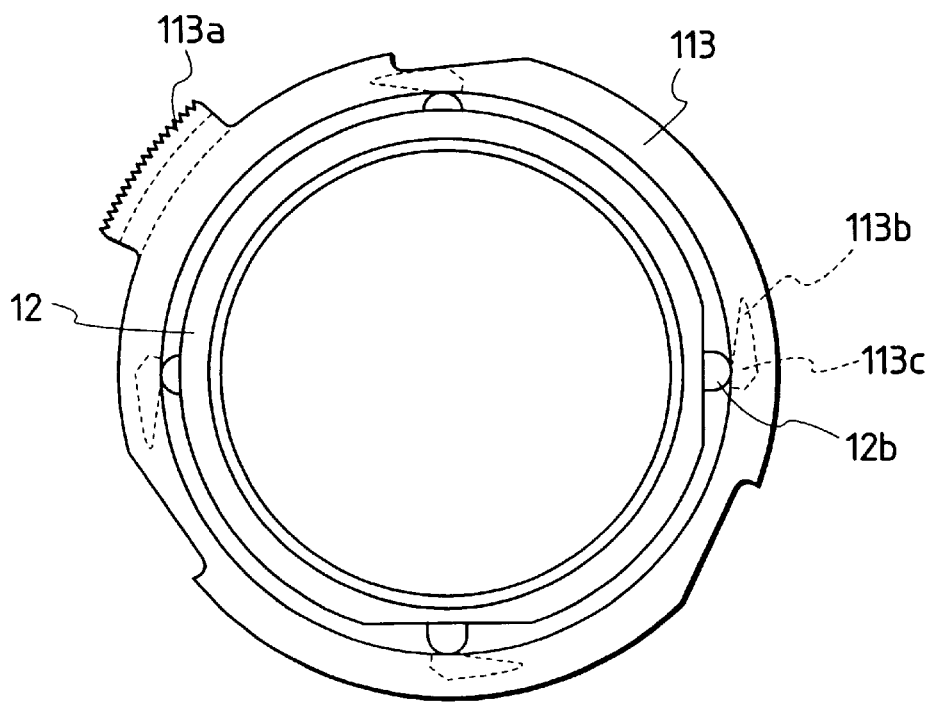

FIGS. 1 to 10B are views showing the mechanical arrangement of the correction optical device in the image blur correction apparatus according to the embodiment of the present invention. FIG. 1 is an exploded perspective view of principal building members of the correction optical device. FIG. 2 shows the correction optical device viewed from the left side in FIG. 1 (a hardware board 111 is detached to expose the interior for the sake of description), FIGS. 3A is a view from the direction of an arrow 3A in FIG. 2, FIG. 3B shows the arrangement pertaining to position detection of a correction lens 11, FIGS. 4A and 4B are sectional views taken along a line 4B—4B in FIG. 2 (FIG. 4A is a partially enlarged plan and sectional view of FIG. 4B), FIG. 5A is a plan view of a coil unit, FIG. 5B is a side view of the coil unit, FIG. 5C is a sectional view of the coil unit, FIGS. 6A to 6C are views for explaining the arrangement of driving means for blur correction according to an embodiment of the present invention upon comparison with the conventional arrangement, FIG. 7 is a plan view showing the hardware board 111 also shown in FIG. 1, FIGS. 8A and 8B are views showing a support frame 12 and base plate 13 also shown in FIG. 1 from the rear surface side of the plane shown in FIG. 2, FIGS. 9A to 9D are views showing a lock ring 113 and rolling regulating ring 112 also shown in FIG. 1 from the plane shown in FIG. 2, and FIGS. 10A and 10B are views for explaining a mechanism of locking the support frame 12 by the lock ring 113.

The arrangement of the correction optical device in the image blur correction apparatus according to the embodiment of the present invention will be briefly described below using FIG. 1.

The correction lens 11 is supported by the support frame 12, which is coupled to the base plate 13. A correction optical system constructed by the correction lens 11 and support frame 12 is driven by driving means comprising permanent magnets, coils, and the like (to be described later) in a pitch direction 114p and yaw direction 114y to correct any image blur. The lock ring 113 locks the support frame 12, i.e., the correction optical system, at a predetermined position when the output from a stepping motor 19 (to be described later) is supplied to a rack 113a. The rolling regulating ring 112 regulates rolling of the support frame 12 about the optical axis by fitting three shaft portions $112a_1$ to $112a_3$ into the support frame 12 via the base plate 13. On the hardware board (printed board) 111, various terminals for the stepping motor, coils, Hall element (to be described later) serving as position detection means, and the like are concentratively formed on a single plane.

The detailed arrangement will be explained below with reference to FIG. 2 and the subsequent figures.

The support frame 12 (see FIGS. 2 and 8A) supports the correction lens 11. Yokes 15p and 15y to which permanent magnets 14p and 14y (not seen in FIG. 2 since they are located behind the yokes 15p and 15y) are attracted are fixed to the support frame 12 by caulking or screws.

Figure 4A:
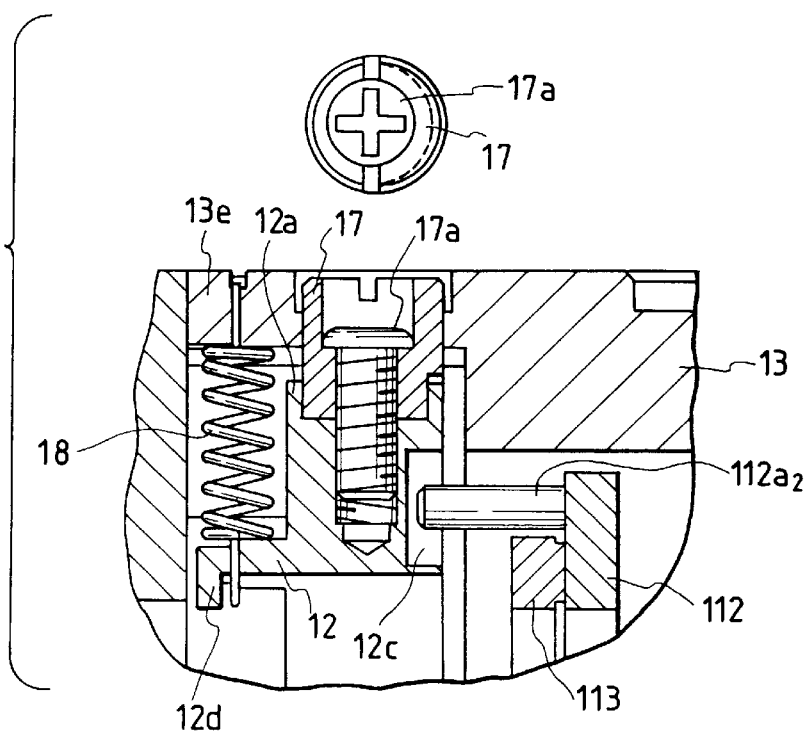
FIGS. 4A and 4B are sectional views taken along a line 4B—4B in FIG. 2.
Figure 4B:
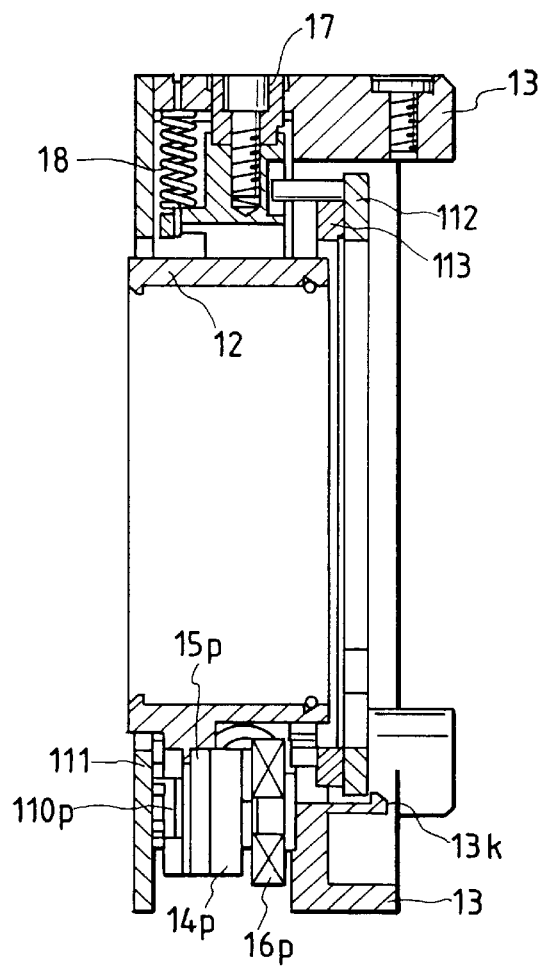
Figure 5A:
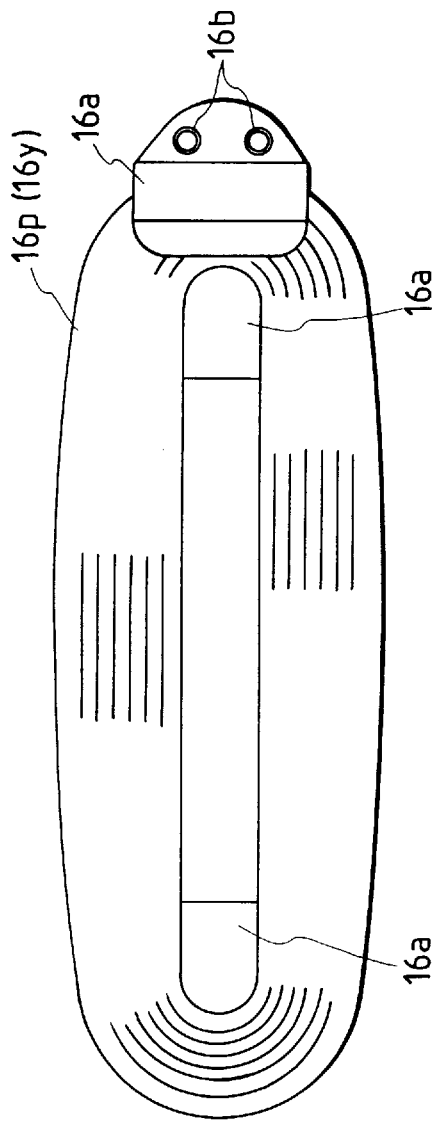
FIGS. 5A, 5B and 5C are respectively a plan view, side view, and sectional view of a coil unit according to an embodiment of the present invention.
Figure 5B:
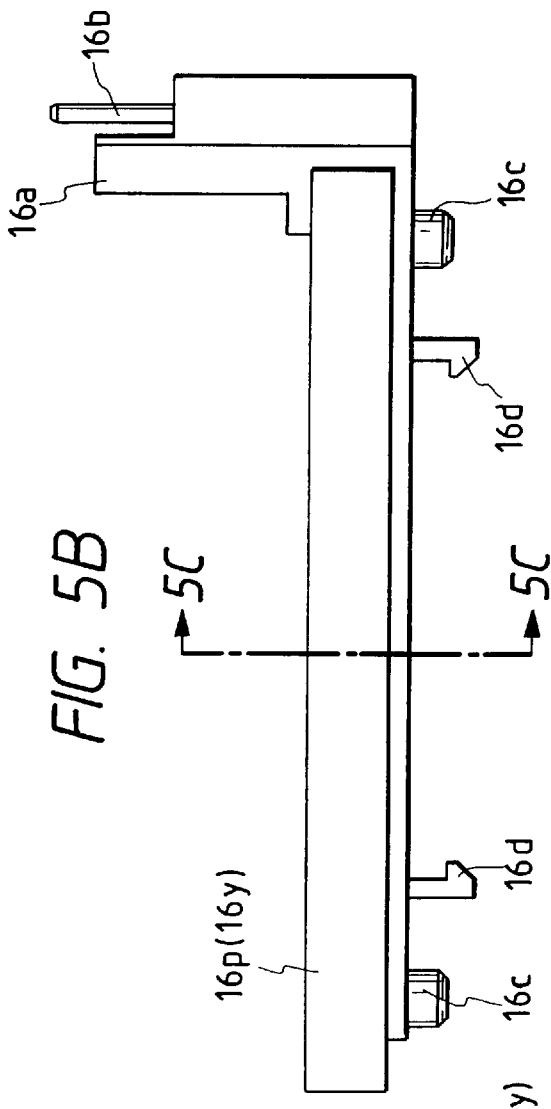
Figure 5C:
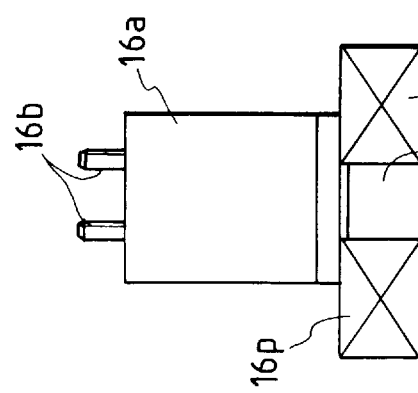

Coils 16p and 16y are attached to the base plate 13 on a surface opposing the permanent magnets 14p and 14y (see FIG. 4B). As shown in FIGS. 5A to 5C, the coil 16p (the same applies to the coil 16y) is formed integrally with a resin coil frame 16a, and the two terminals of the coil 16p are connected to terminal pins 16b as conductive members press-fitted into the coil frame 16a to form a unit. The terminal pins 16b extend through and are soldered to the hardware board 111 (to be described later). Note that FIG. 5A is a plan view of a coil unit 15, FIG. 5B is a side view, and FIG. 5C is a sectional view taken along a line 5C—5C in FIG. 5B.

The relationship among the yokes 15p and 15y, permanent magnets 14p and 14y, and coils 16p and 16y which construct the driving means for the correction optical system with the above arrangement will be explained below with reference to FIGS. 6A to 6C. Note that FIG. 6A shows an embodiment of the present invention, FIG. 6B shows an unpreferable example, and FIG. 6C shows the prior art.

In the prior art shown in FIG. 6C, coils 76p and 76y are attached to a support frame 75. Hence, a permanent magnet 73 forms a closed magnetic path indicated by a broken circle 73b together with first and second yokes 712 and 72. The reason why such closed magnetic path is formed is to adjust the flow of magnetic flux and to improve driving efficiency.

In the embodiment of the present invention, when the permanent magnet 14p (14y) is attached to the support frame 12, the permanent magnet 14p (14y) is mounted on the support frame 12 and a counter yoke 15ap (15ay) is set at a position opposing the magnet 14p (14y) so as to form a closed magnetic path, as shown in FIG. 6B. In this way, a closed magnetic path 14a is formed.

However, in the embodiment of the present invention, no counter yokes are disposed to form a closed magnetic path, as shown in FIG. 6A, to obtain good balance between the driving efficiency that can be improved by attaching the counter yokes 15ap and 15ay, and followability that deteriorates due to an increase in weight arising from the counter yokes 15ap and 15ay attached. In other words, this embodiment adopts an arrangement that can reduce the absolute value of consumption power not by improving the driving efficiency but by preventing the weight from increasing.

Figure 3A:
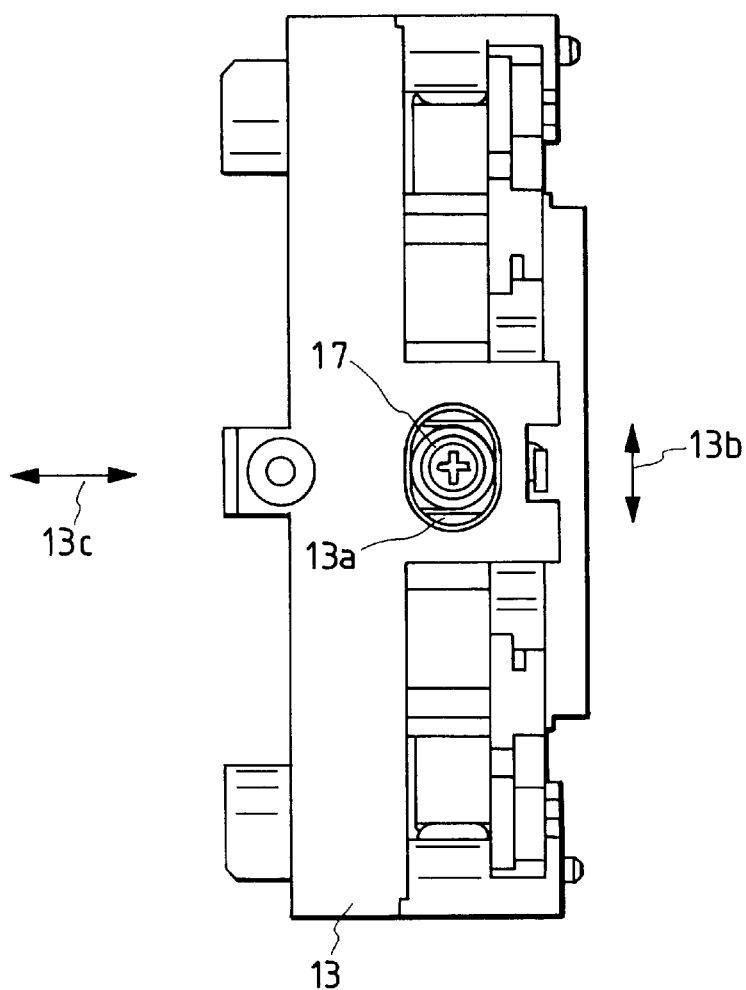
FIGS. 3A and 3B are respectively a view from the direction of an arrow 3A in FIG. 2, and a view showing the arrangement pertaining to position detection of a correction lens.

As shown in FIG. 2 and FIGS. 8A and 8B, arms 12a radially extend from the support frame 12 in three directions, and rollers 17 are fixed by screws to these arms 12a (more specifically, via screws 17a, as shown in FIG. 4A). These rollers 17 are fitted into guide grooves 13a (see FIGS. 1 and 3A) of the base plate 13, as will be described below. Since each guide groove 13a is an elongated hole extending in the direction of an arrow 13b, as shown in FIG. 3A, each of the three rollers 17 can move in this direction. More specifically, the support frame 12 is free to slide in all the directions in a plane including the base plate 13 (its position is regulated in only an optical axis direction 13c in FIG. 3A).

Upon assembly, the roller or rollers 17 is or are fixed by a screw or screws to one or two of the arms 12a of the support frame 12. The roller or rollers 17 fixed by the screw or screws is or are inserted into the guide groove or grooves 13a of the base plate 13 to place the support frame 12 on the base plate 13. Finally, the remaining rollers or roller 17 are or is fixed by screws or a screw to the arms or arm 12a of the support frame via the remaining guide grooves or groove 13a, thus completing assembling of the support frame 12 to the base plate 13.

When each roller 17 uses an eccentric roller, as shown in FIG. 4A, the tilt of the correction lens 11 can be adjusted (note that FIG. 4A is a partially enlarged plan and sectional view of FIG. 4B, as described above). More specifically, since each arm 12a moves back or forth in the optical axis direction by rotating the roller 17, the tilt of the correction lens 11 can be adjusted by adjusting the positions of the three arms 12a in the optical axis direction by means of the rollers 17, and after the adjustment, the screws 17a are fastened to unrotatably fix the rollers 17 to the arms 12a.

The lock ring 113 (FIGS. 9A and 9B) is rotatably supported by the base plate 13 from the rear surface side of the plane shown in FIG. 2, and a gear (not shown) mounted on the stepping motor 19 (see FIG. 2), which is attached to the base plate 13 via a motor base plate 19B (see FIG. 2), meshes with the rack 113a, thus driving the lock ring 113 in the rotation direction. Four cam portions 113b formed on the lock ring 113 serve as locking means since they lock or unlock the support frame 12 in cooperation with four projections 12b shown in FIG. 8A.

More specifically, when the lock ring 113 shown in FIG. 9A is rotated counterclockwise, because the cam portions 113b of the lock ring 113 are separated from the projections 12b of the support frame 12, as shown in FIG. 10A, the support frame 12 becomes free to rotate with respect to the lock ring 113 (unlocked state). On the other hand, when the lock ring 113 is rotated clockwise, since flat portions 113c of the cam portions 113b contact the projections 12b, as shown in FIG. 10B, the support frame 12 and lock ring 113 engage with each other. In other words, the support frame 12 is locked with respect to the base plate 13.

Hence, when blur correction is done, the lock ring 113 is driven by the stepping motor 19 to rotate counterclockwise to set the support frame 12 to be free to rotate with respect to the lock ring 113 (unlocked state). Upon completion of blur correction, the lock ring 113 is driven to rotate clockwise to lock the support frame 12 with respect to the base plate 13 (locked state).

To restate, the support frame 12 is coupled to the base plate 13 via the rollers 17 and guide grooves 13a, and its position is regulated in the optical axis direction. This support method assures easy assembly, the guide grooves 13a are integrally formed on the base plate 13, and fitting management between the rollers 17 and guide groove holes 13a is easy (for the sake of easy understanding, consider the relationship between rollers and cams popularly used in a lens barrel). Furthermore, since the rollers 17 use known eccentric cams, the tilt between the support frame 12 and base plate 13 can be adjusted by rotating the rollers 17.

However, in case of the above support method, the support frame 12 is free to move in the pitch and yaw directions 114p and 114y (blur correction directions) shown in FIG. 3A, but rotates in a rolling direction 114r. This rotation impairs the blur correction precision.

In this embodiment, in order to remove the influences of rolling, the following method is used.

FIG. 8B shows the base plate 13 (FIG. 2) alone viewed from the rear side, and the base plate 13 is formed with elongated holes $13d_1$, $13d_2$, and $13d_3$ extending in the direction 114y. The shaft portions $112a_1$, $112a_2$, and $112a_3$ extending from the rolling regulating ring 112 (FIGS. 9C and 9D) in the direction going into the page of the drawing extend through these elongated holes $13d_1$, $13d_2$, and $13d_3$, respectively. The shaft portion $112a_1$ and elongated hole $13d_1$, and the shaft portion $112a_3$ and elongated hole $13d_3$ fit with each other, and from the two contact points between these members, the rolling regulating ring 112 is movable with respect to the base plate 13 only in the direction 114y.

The elongated hole $13d_2$ is larger than the elongated holes $13d_1$ and $13d_3$ (although they are illustrated to have roughly the same sizes in FIG. 8B) to increase fitting play with the shaft portion $112a_2$. If all the three shaft portions $112a_1$, $112a_2$, and $112a_3$ loosely fit in holes, they disturb smooth movement between the rolling regulating ring 112 and base plate 13 as a result of over-fitting. Hence, one of the three elongated holes is preferably formed to be larger than the remaining holes.

With reference to the elongated hole $13d_1$, the elongated hole $13d_3$ has a longer span in the direction 114y than the elongated hole $13d_2$. Hence, when the elongated holes $13d_1$ and $13d_3$ are formed as fitting holes, rolling play between the rolling regulating ring 112 and base plate 13 can be minimized even when fitting play of the shaft portions $112a_1$ and $112a_3$ has taken place. (If the elongated holes $13d_1$ and $13d_2$ are formed as fitting holes, the span therebetween in the direction 114y is short, and rolling play becomes larger).

The rolling regulating ring 112 is elastically locked and regulated in the optical axis direction by pawls 13k (see FIGS. 4B and 8B) formed on the base plate 13. The shaft portions $112a_1$, $112a_2$, and $112a_3$ of the rolling regulating ring extend through the base plate 13, and fit into elongated holes $12c_1$, $12c_2$, and $12c_3$ which are formed on the rear surface of the support frame 12 and extend in the direction 114$p$ (see the support frame rear view of FIG. 8A, and FIG. 4B). In this case as well, the elongated holes 12$c_1$ and 12$c_2$, and the shaft portion 112$a_2$ fit each other, and the elongated hole 12$c_3$ is formed to be larger than other holes, thus avoiding over-fitting. At this time, the elongated hole 12$c_3$ is formed to be larger than other holes for the same reason as that for the elongated holes 13$d$. Hence, the support frame 12 is movable with respect to the rolling regulating ring 112 in only the direction 114$p$.

With the above-mentioned arrangement, the support frame 12 is movable with respect to the base plate 13 in only the directions 114$p$ and 114$y$, and its movement is regulated in the rolling direction 114$r$. However, in practice, since rolling arising from fitting play among the shaft portions 112$a$ and elongated holes 13$d$ and 12$b$ slightly remains unremoved, springs 18 (see FIG. 2 and FIGS. 4A and 4B) are inserted between hooks 12$d$ formed on the arms 12$a$ on the support frame 12, and hooks 13$e$ formed on the circumferential surface of the base plate 13. The springs 18 radially extend from the center of the support frame 12 in three directions, as shown in FIG. 2 to pull the support frame 12 outward in all directions. Since the hooks 12$d$ are formed at positions radially separated a large distance from the center of the support frame 12, when a force in the rolling direction acts on the support frame 12, that force can be suppressed by the elastic forces of the springs biasing outward in all directions. More specifically, since rolling regulation is attained elastically, the slightest rolling play can be prevented.

Figure 3B:
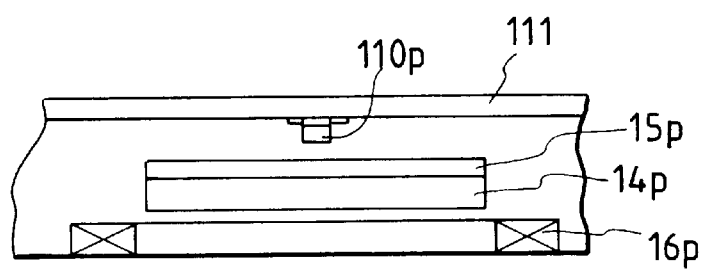

FIG. 7 shows the hardware board 111 shown in FIGS. 1, 3B, and 4B. On the rear surface side of patterns 111$cp$ and 111$cy$ shown in FIG. 7, Hall elements 110$p$ and 110$y$ serving as position detection means (to be described later; FIG. 2 shows their positional relationship alone) are coupled by reflowing. Note that the position detection means use Hall elements in this embodiment, but magnetic detection means such as MR elements and the like may be used instead. Also, optical detection means such as photoreflectors may be used.

The hardware board 111 is attached to the base plate 13 using positioning pins 13$f$ formed on the base plate 13 and holes 111$d$ formed on the hardware board 111 as guides, and screws are inserted into holes 111$e$ and are screwed into screw holes 13$g$ (see FIG. 2). At this time, since the terminal pins 16$b$ of the coils that form units, as described above, extend in a direction coming out of the page of the drawing of FIG. 2, and connection terminals 194$a$, 194$b$, 195$a$, and 195$b$ of coils 4 and 5 of the stepping motor 19 (to be described later) also extend in this direction, the terminal pins 16$b$ and connection terminals 194$a$, 194$b$, 195$a$, and 195$b$ also naturally extend through holes 111$b$ and 111$a$ (see FIGS. 8A and 8B). These holes 111$a$ and 111$b$ are through holes, and the terminal pins 16$b$ and the connection terminals 194$a$, 194$b$, 195$a$, and 195$b$ are soldered at these holes to attain electrical connections.

As the position detection means attached to the hardware board 111, the Hall elements 110$p$ and 110$y$ are used (see FIGS. 3B and 6A), as described above.

The operation of the Hall elements will be explained below with reference to FIG. 6A.

The Hall element 110$p$ (110$y$) changes its output in correspondence with changes in surrounding magnetic field. In FIG. 6A, the Hall element 110$p$ (110$y$) opposes the permanent magnet 14$p$ (14$y$) which is magnetized in two poles. The relationship between the Hall element 110$p$ (110$y$) and permanent magnet 14$p$ (14$y$) shifts as the support frame 12 is driven (e.g., in the pitch direction 114$p$). Thus, the strength of the magnetic field applied to the Hall element 110$p$ (110$y$) changes, and the Hall element 110$p$ (110$y$) changes its output accordingly, thereby detecting the position of the support frame 12.

FIG. 12 is a block diagram showing the circuit arrangement of an exchangeable lens type auto-focus (AF) single-lens reflex camera which mounts the image blur correction apparatus including the correction optical device, which has been described above with reference to FIGS. 1 to 10B.

The camera shown in FIG. 12 has a camera main body 200 and an exchangeable lens main body 300. A camera CPU 201 (microcomputer) controls operations of various devices in the camera main body 200, as will be described later, and communicates with a lens CPU 301 via a camera contact unit 202 when the lens main body 300 is attached to the camera main body 200. The camera contact unit 202 is comprised of a signal transmission contact 202$a$ for transmitting signals to the lens main body 300 side, a power supply contact 202$b$ for supplying a power supply voltage from a power supply 209 on the camera main body 200 side to the lens main body 300 side, and a ground contact 202$c$ which is connected to the lens main body 300 side and to ground. A power supply switch 203 can be externally operated, and is used for starting the camera CPU 201 to allow power supply to actuators, sensors, and the like in the system, and system operations. A two-stroke release operation element 204 can be externally operated, and its output signal is input to the camera CPU 201.

When a switch SW1 that responds to the first stroke operation of the release operation element 204 is ON, the camera CPU 201 determines the exposure amount of a photometry circuit 205, performs focusing, and so on to start preparation for photographing. When the camera CPU 201 detects that a switch SW2 which responds to the second stroke operation is ON, it transmits a diaphragm operation command (to be described later) to the lens CPU 301 (which controls operations of various devices in the lens main body 300, as will be described later, and communicates with the camera CPU 201 via a lens contact unit 302 when the lens main body 300 is attached to the camera main body 200) of the lens main body 300, and also transmits an exposure start command to an exposure circuit 206 to actually start exposure. Upon reception of an exposure end signal, the CPU 201 transmits a feeding start command to a feeding circuit 207 to wind up the film. A distance measuring circuit 208 measures the distance to an object present in a distance measuring area in accordance with a distance measurement start command transmitted from the camera CPU 201 when the switch SW1 is turned on by the first stroke operation of the release operation element 204. Then, the circuit 208 determines the moving amount required for moving the focusing lens to that focal point, and transmits the moving amount to the camera CPU 201.

The lens contact unit 302 is comprised of a signal transmission contact 302$a$ for receiving signals transmitted from the camera main body 200 side, a power supply contact 302$b$ for receiving a power supply voltage from the camera main body 200 side, and a ground contact 302$c$ which is connected to the camera main body 200 side and to ground.

An IS switch 303 can be externally operated, and can select whether or not image blur correction operation (to be also referred to as IS operation hereinafter) is to be done (if the switch 303 is ON, the IS operation is selected). A vibration detection device 304 comprises a vibration detection portion 304$a$ for detecting the accelerations, velocities, or the like of the vertical and horizontal vibrations (pitch and yaw directions) of the camera in accordance with a command from the lens CPU 301, and a calculation output portion 304*b* for outputting a displacement obtained by electrically or mechanically integrating the output signal from the vibration detection portion 304*a* to the lens CPU 301. A gravitation detection portion 305 comprises, e.g., a mercury switch, and detects the gravitation direction of the camera. The portion 305 outputs the detected gravitation direction to the lens CPU 301. Note that the posture detection technique by means of the mercury switch will be explained later with reference to FIGS. 14A and 14B.

The lens CPU 301 calculates the levels of currents that can be supplied in two different driving directions (pitch and yaw directions) on the basis of the output from the gravitation detection portion 305. A current variable device 306 restricts the currents to be supplied to driving portions in two different driving directions (pitch and yaw directions) on the basis of calculation results of the lens CPU 301. A current variable device 306*a* is used for the driving portion in the pitch direction, and a current variable device 306*b* is used for the driving portion in the yaw direction. The current restricting levels to be distributed to the driving portions in the two directions are set as follows. That is, currents required for holding the correction optical system against gravitation are calculated in each driving directions on the basis of the detection result of the gravitation detection portion 305, an equal predetermined value is added to these current values, and the sums are set as the current restricting levels.

A correction optical device 307 has been described above with reference to FIGS. 1 to 10B, and is comprised of the correction lens 11, the support frame 12, a correction optical system driving portion 307*a* in the pitch direction, which includes the permanent magnet 14*p*, coil 16*p*, and the like and drives the correction lens 11 in the pitch direction, a correction optical system driving portion 307*b* in the yaw direction, which includes the permanent magnet 14*y*, coil 16*y*, and the like, and drives the correction lens 11 in the yaw direction, and so forth. Note that the correction optical system driving portion (pitch direction) 307*a* and correction optical system driving portion (yaw direction) 307*b* in the correction optical device 307 are controlled by the lens CPU 301 within the ranges of current levels to be supplied to the respective driving portions, which are restricted by the current variable devices 306*a* and 306*b* in each directions.

A focusing device 308 comprises a driving circuit 308*a* controlled by the lens CPU 301 in accordance with the moving amount of the focusing lens transmitted from the camera CPU 201, as described above, and a focusing lens 308*b* driven by the driving circuit 308*a*. A diaphragm device 309 comprises a driving circuit 309*a* controlled by the lens CPU 301 in accordance with the diaphragm movement command transmitted from the camera CPU 201, as described above, and a diaphragm element 309*b* which is driven by the driving circuit 309*a* to determine the opening area.

Figure 13B:
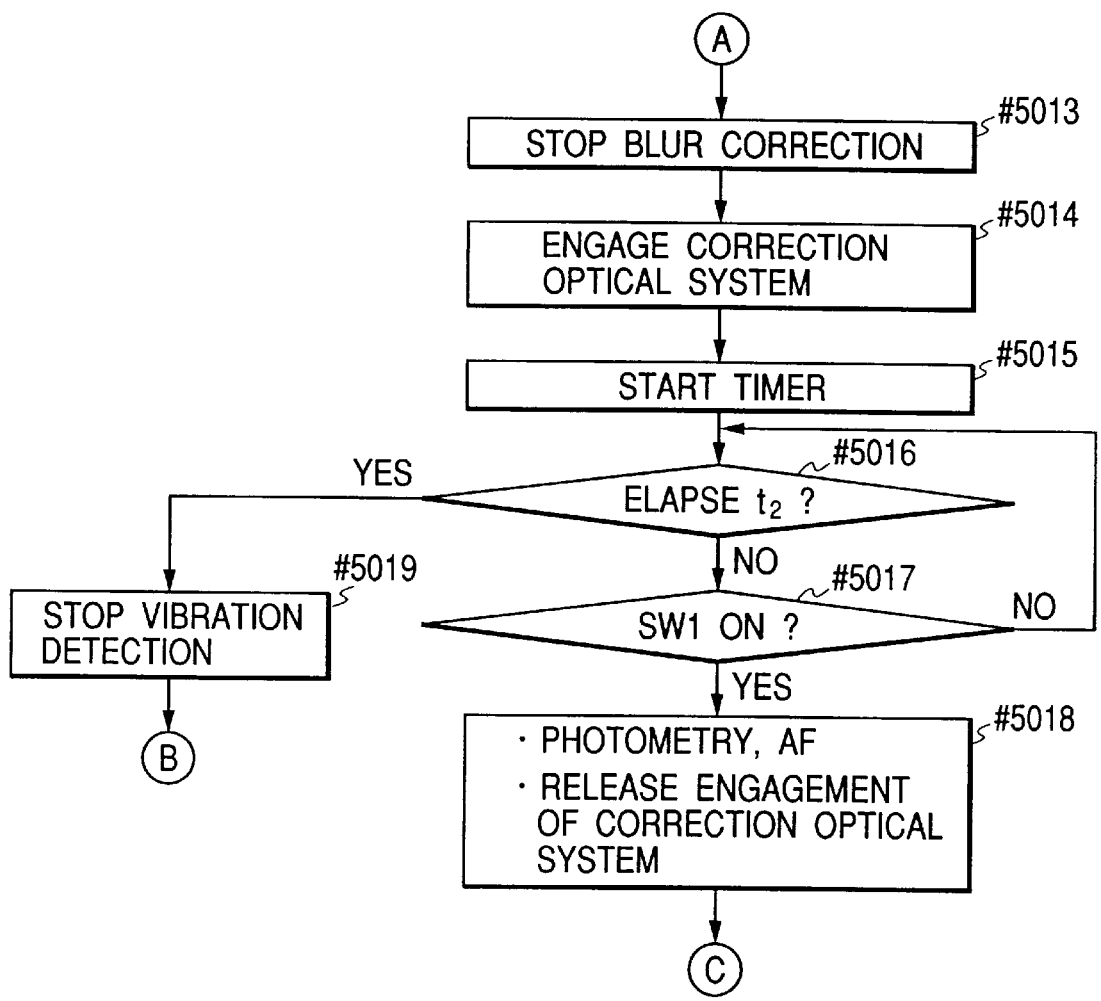
FIG. 13 comprised of FIGS. 13A and 13B is a flow chart showing a series of operations of the camera shown in FIG. 12.

FIGS. 13A and 13B are flow charts showing the operation of principal part in the camera CPU 201 and lens CPU 301 of the single-lens reflex camera shown in FIG. 12.

It is checked in step #5001 if the power supply switch 203 is ON. If it is determined in step #5001 that the power supply switch 203 is ON, a power supply voltage is supplied from the power supply 209 in the camera main body 200 to the lens main body 300, and communications between the camera main body 200 and lens main body 300 start. Also, when a new battery is set or the lens main body 300 is attached to the camera main body 200, a power supply voltage is supplied from the power supply 209 in the camera main body 200 to the lens main body 300, and communications between the camera main body 200 and lens main body 300 start.

After the communications between the camera main body 200 and lens main body 300 start, the camera CPU 201 checks in step #5002 if a switch SW1 signal is ON by the first stroke operation of the release operation element 204. If the switch SW1 signal is ON, the flow advances to step #5003, and the lens CPU 301 checks if the IS switch 303 is ON (to select IS operation). If the IS operation is selected, the flow advances to step #5004; otherwise, the flow advances to step #5020.

The lens CPU 301 starts its internal timer in step #5004, controls the gravitation detection portion 305 to detect the gravitation direction in step #5005, and determines the current restricting levels based on the obtained gravitation direction in step #5006. More specifically, the current restricting level of the current to be supplied to the correction optical system driving portion side in a direction in which the influences of gravitation are larger is set to be larger than that of the other correction optical system driving portion. In other words, an allowable energization level for the correction optical system driving portion in a direction in which the influences of gravitation are larger is set to be higher than the other correction optical system driving portion.

In step #5007, the camera CPU 201 drives the photometry circuit 205 and distance measuring circuit 208 to obtain photometry information and distance measurement information. Also, the lens CPU 301 drives the focusing device 308 to focus based on the distance measurement information, starts vibration detection via the vibration detection device 304, and energizes the stepping motor 19 to release the above-mentioned lock (engagement) means so as to allow blur correction control by driving the correction optical device 307 (#5007). The lens CPU 301 then checks in step #5008 if the contents measured by the timer have reached a predetermined time $t_1$. If the contents have not reached the predetermined time $t_1$ yet, the control stays in this step until the time $t_1$ elapses. This is to wait until the output from the vibration detection device 304 stabilizes. After that, if the predetermined time $t_1$ has elapsed, the lens CPU 301 controls the correction optical device 307 within the current values set by the current variable device 306 in each driving directions, on the basis of a target value signal output from the vibration detection device 304, and the outputs from the above-mentioned position detection means in step #5009. More specifically, the CPU 301 drives the correction lens 11 via the correction optical system driving portions 307*a* and 307*b* to start blur correction control.

The camera CPU 201 then checks in step #5008 if the switch SW2 that responds to the second stroke operation of the release switch 204 is ON. If the switch SW2 is not ON, the flow advances to step #5012 to check again if the switch SW1 is ON. If the switch SW1 is not ON, either, the flow advances to step #5013. The lens CPU 301 stops blur correction control in step #5013, and energizes the stepping motor 19 to lock the correction lens 11 in the correction optical device 307 at a predetermined position (optical axis central position) by the lock means in step #5014.

If it is determined in step #5010 that the switch SW2 is not ON but it is determined in step #5012 that the switch SW1 is ON, the flow returns to step #5010. If it is determined in step #5010 in turn that the switch SW2 is ON, the flow advances to step #5011. In step #5011, the lens CPU 301 controls the diaphragm device 309, and the camera CPU 201 drives the exposure circuit 206 to expose a film. Upon completion of exposure, the camera CPU 201 checks the state of the switch SW1 in step #5012. If the switch SW1 is OFF, the flow advances to step #5013, and the lens CPU 301 stops blur correction control, as described above. Subsequently, in step #5014, the lens CPU 301 energizes the stepping motor 19 to lock the correction lens 11 in the correction optical device 307 at the predetermined position (optical axis central position) by the lock means.

Upon completion of the above-mentioned steps, the flow advances to step #5015, and the lens CPU 301 resets and restarts its internal timer. The camera CPU 201 then checks in step #5016 and #5017 if the switch SW1 is turned on within a predetermined time $t_2$. If the switch SW1 is turned on again within the predetermined time $t_2$ after blur correction stopped, the flow advances from step #5017 to step #5018, and the camera CPU 201 and lens CPU 301 execute photometry and AF (distance measurement and focusing), and release locking (engagement) of the correction lens 11. Since vibration detection continues, the flow advances to step #5009, and the correction lens 11 is driven based on the target value signal and the outputs from the position detection means, thus restarting blur correction. After that, the same operations as described above repeat themselves.

With the above-mentioned processing, when the photographer turns on the switch SW1 immediately after he or she has stopped the ON state of the switch SW1, the vibration detection device 304 can be prevented from being started upon every ON operation to wait until its output stabilizes.

On the other hand, if it is determined in step #5016 that the switch SW1 is not turned on within the predetermined time $t_2$ after blur correction stopped, the flow advances from step #5016 to #5019 to stop vibration detection (stop operation of the vibration detection device 304). After that, the flow returns to step #5002 to wait until the switch SW1 is ON.

If it is determined in step #5003 that the IS operation is not selected, the flow advances to step #5020. In step #5020, the camera CPU 201 performs photometry and AF (distance measurement), and the lens CPU 301 performs AF (focusing). In step #5021, the camera CPU 201 checks if the switch SW2 is ON. If the switch SW2 is not ON, the flow advances to step #5023 to check again if the switch SW1 is ON. If the switch SW1 is not ON, either, the flow returns to step #5002 to wait until the switch SW1 is ON.

If it is determined in step #5021 that the switch SW2 is not ON but it is determined in step #5023 that the switch SW1 is ON, the flow returns to step #5021. If it is detected in step #5021 that the switch SW2 is ON, the flow advances to step #5022. In step #5022, the lens CPU 301 controls the diaphragm device 309 and the camera CPU 201 drives the exposure circuit 206 to expose the film. The flow then advances to step #5023, and the camera CPU 201 checks the state of the switch SW1. Based on this checking result, the flow returns to step #5002 or #5021.

In the single-lens reflex camera of this embodiment, the series of operations repeat themselves until the power supply switch 203 is turned off. When the power switch 203 is turned off, the communications between the camera CPU 201 and lens CPU 301 end, and power supply to the lens main body 300 stops.

Figure 14A:
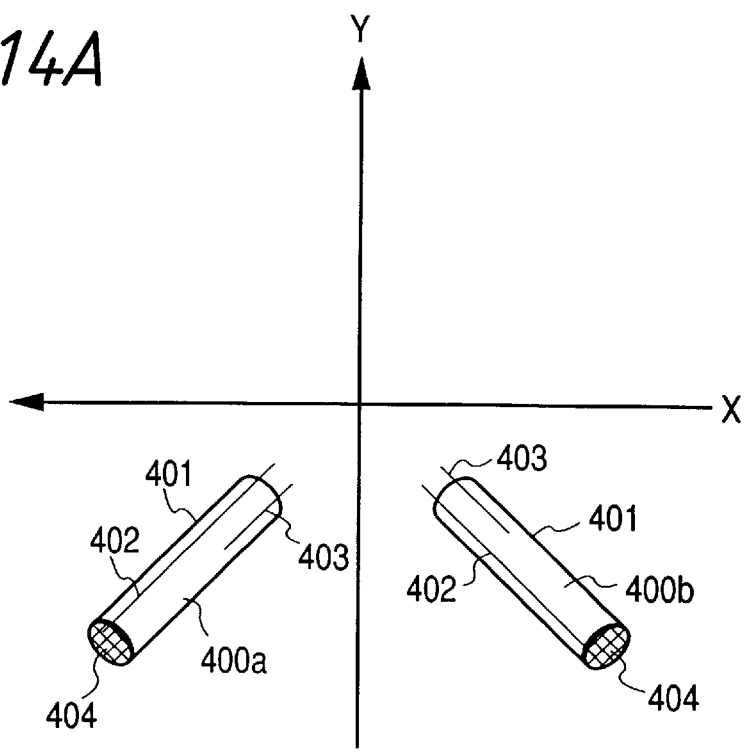
FIGS. 14A and 14B are views for explaining a mercury switch as a means, built in the camera shown in FIG. 12, for detecting the gravitation direction.
Figure 14B:
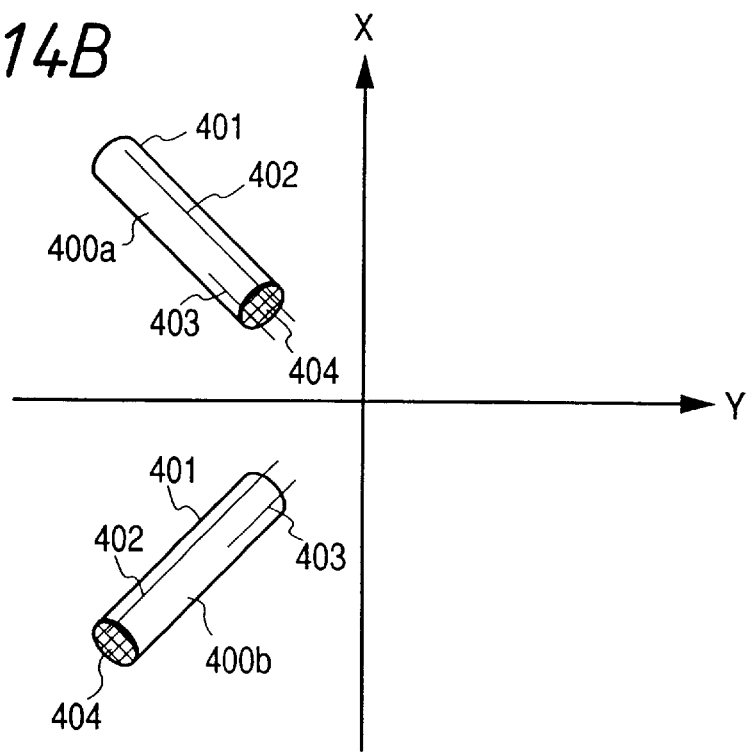

FIGS. 14A and 14B are views for explaining an example of the arrangement of the gravitation detection portion 305. In this case, assume that posture detection is done by mercury switches.

As shown in FIGS. 14A and 14B, two contact segments 402 and 403 having different lengths are set in a sealed tube 401 such as a glass tube, and mercury 404 is sealed in that tube. In FIGS. 14A and 14B, X indicates the right-and-left direction when the camera is held at regular position, and Y indicates the up-and-down direction when the camera is held at regular position. Two mercury switches 400$a$ and 400$b$ are placed to have a tilt of 45° from the X and Y directions.

In the state shown in FIG. 14A, since mercury 404 contacts the contact segment 402 alone in both the mercury switches 400$a$ and 400$b$, the two contact segments 402 and 403 are not connected to each other, and both the switches are OFF. When the camera posture has changed to the state shown in FIG. 14B, only the mercury switch 400$a$ is ON since its contact segments 402 and 403 are connected to each other. On the other hand, the mercury switch is OFF since its contact segments 402 and 403 are not connected to each other.

In this manner, the camera posture can be detected by the ON/OFF states of the two mercury switches.

The correspondence between the arrangements of the embodiment and those of the present invention has already been described above. However, the present invention is not limited to such specific arrangements of the embodiment, and may be applied to any other arrangements as long as they can attain the functions defined in claims or the functions of the embodiment can be achieved.

(Modification)

In the above embodiment, the current restricting levels of the two driving means are changed so that the driving means in a direction in which the influences of gravitation are large has a driving force equal to the other driving means. However, the present invention is not limited to such specific arrangement, and the same effect can be obtained by PMW control.

In the above embodiment, the mercury switches are used for detecting the gravitation direction, but the present invention is not limited to such specific switches.

The present invention can appropriately replace the software and hardware arrangements of the above embodiment with each other.

The present invention can also be applied to various cameras such as a single-lens reflex camera, lens-shutter camera, video camera, and the like, optical equipment or other devices other than the cameras, devices applied to such cameras, optical equipment, and other devices, and their constituting elements.

The inventions described in claims or the arrangements of the embodiment may form a single apparatus as a whole or separate apparatuses, may be combined to other apparatuses, or may be elements constituting an apparatus.

As the correction optical system of the present invention, not only a shift optical system that moves an optical element in a plane perpendicular to the optical axis, but also a light beam change means such as a variable apex angle prism may be used.

To recapitulate, according to the embodiment of the present invention, since the current restricting level of the current to be supplied to one, in a direction in which, e.g., the influences of gravitation are larger, of the first and second driving means is set to be larger than the other driving means on the basis of the detection result of the gravitation detection means, an image blur correction apparatus which can give equal driving performances to the first and second driving means for driving the correction optical system independently of the gravitation direction can be provided.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image blur correction apparatus which is adapted to an optical apparatus, comprising:

image blur correction means;

driving means for driving said image blur correction means in a predetermined direction;

energization control means for controlling energization to said driving means in accordance with a vibration signal corresponding to a vibration state of said optical apparatus;

energization restricting means for restricting a current supplied to said driving means by said energization control means to less than a predetermined restricting level; and determination means for determining the restricting level of said energization restricting means in accordance with a detection result of gravitation direction detection means for detecting a gravitation direction.

2. An apparatus according to claim 1, wherein said determination means includes means for setting the energization restricting level at a first level when the gravitation direction detected by said gravitation direction detection means does not agree with the driving direction of said driving means, and setting the energization restricting level at a second level higher than the first level when the detected gravitation direction agrees with the driving direction.

3. An apparatus according to claim 1, further comprising:

another driving means for driving said image blur correction means in a direction different from the predetermined direction.

4. An apparatus according to claim 3, wherein said energization control means includes means for controlling energization to said other driving means in accordance with the vibration signal corresponding to the vibration state of said optical apparatus, said energization restricting means includes means for restricting a current supplied to said other driving means by said energization control means to less than a predetermined restricting level, and said determination means includes means for determining the restricting level of said energization restricting means in accordance with the detection result of said gravitation direction detection means.

5. An apparatus according to claim 4, wherein said determination means includes means for setting the energization restricting level at a first level when the gravitation direction detected by said gravitation direction detection means does not agree with the driving direction of said other driving means, and setting the energization restricting level at a second level higher than the first level when the detected gravitation direction agrees with the driving direction.

6. An apparatus according to claim 3, wherein said other driving means includes means for driving said image blur correction means in a direction perpendicular to the driving direction of said driving means.

7. An apparatus according to claim 1, wherein said determination means includes means for determining the restricting level at the beginning of operation of said image blur correction means according to the vibration signal.

8. An apparatus according to claim 7, wherein said image blur correction apparatus is applied to a camera, said image blur correction means includes means for starting the image blur correction in accordance with a predetermined operation of a release operation portion of said camera, and said determination means includes means for determining the restricting level in accordance with the predetermined operation of the release operation portion.

9. An apparatus according to claim 1, wherein said image blur correction means includes means for optically correcting image blur.

10. An apparatus according to claim 1, wherein said image blur correction means includes means for correcting image blur by displacing along a predetermined plane.

11. An apparatus according to claim 1, wherein said driving means includes a coil placed in a magnetic circuit, and said energization control means includes means for energizing said coil in accordance with the vibration signal.

* * * * *

UNITED STATES PATENT AND TRADEMARK OFFICE
CERTIFICATE OF CORRECTION

PATENT NO. : 5,978,598
DATED : November 2, 1999
INVENTOR(S) : MASANORI ISHIKAWA

It is certified that error appears in the above-identified patent and that said Letters Patent is hereby corrected as shown below:

COLUMN 3
Line 62, "FIGS. 3A" should read --FIG. 3A--.

COLUMN 9
Line 25, "each" should read --each of the--; and
Line 58, "principal" should read --a principal--.

COLUMN 10
Line 46, "each" should read --each of the--.

COLUMN 12
Line 48, "claims" should read --the claims--.

Signed and Sealed this

Twenty-eighth Day of November, 2000

Attest:

Q. TODD DICKINSON

*Attesting Officer*  *Director of Patents and Trademarks*